United States Patent [19]

Nerlich et al.

[11] Patent Number: 4,905,520
[45] Date of Patent: Mar. 6, 1990

[54] PRESSURE SENSOR

[75] Inventors: Ernst G. Nerlich, Essen; Karl-Heinz Berger, Gelsenkirchen-Resse, both of Fed. Rep. of Germany

[73] Assignee: Bochumer Eisenhütte Heintzmann GmbH & Co. KG, Bochum, Fed. Rep. of Germany

[21] Appl. No.: 257,104

[22] Filed: Oct. 12, 1988

[30] Foreign Application Priority Data

Oct. 16, 1987 [DE] Fed. Rep. of Germany ....... 3735066

[51] Int. Cl.$^4$ .................................................. G01L 9/14
[52] U.S. Cl. ......................................... 73/753; 73/722; 73/728; 338/32 H
[58] Field of Search ................... 73/719, 722, 725, 728, 73/753; 338/32 H

[56] References Cited

U.S. PATENT DOCUMENTS 4,667,514 5/1987 Baer ...................................... 73/728

OTHER PUBLICATIONS

Hallgeneratoren und Feldplatten, Ing.(grad.) Wilhelm Teichmann, Dr. Wolfgang Flossmann, Bauelemente, Elektronik, 9/6.5.1983, Sondertell, pp. 107–112.

*Primary Examiner*—Donald G. Woodiel
*Attorney, Agent, or Firm*—Herbert Dubno

[57] ABSTRACT

The pressure sensor has a mechanical pressure receiving member and a mechanical-electrical transducer connected to it. The transducer comprises a permanent magnet attached with a moving portion of the pressure receiving member which cooperates with a locally fixed Hall-effect sensor mounted on the housing. To linearize the characteristic response curve of the transducer the inner surface of the housing wall is shaped like a funnel in a region between the permanent magnet and the Hall-effect sensor and in the vicinity of the permanent magnet. Because of this geometry the field strength lines are bunched increasingly on increasing separation of the permanent magnet from the Hall-effect sensor so that the field strength at the Hall-effect sensor increases and/or decreases approximately linearly with displacement path of the magnet.

4 Claims, 2 Drawing Sheets

PRESSURE SENSOR

FIELD OF THE INVENTION

Our present invention relates to a pressure sensor and, more particularly, to a pressure sensor based on mechanical-electrical energy conversion.

BACKGROUND OF THE INVENTION

A pressure sensor using mechanical-electrical transduction comprises a mechanical pressure receiving member which is connected at one end with a pressure chamber in which the pressure is to be measured and which has a pin, a membrane, a Bourdon tube or another suitable transmitting means which generates a length change inside the pressure sensor corresponding to the pressure residing in the pressure chamber.

Inside the housing this moving portion of the pressure receiving member is provided with a permanent magnet which cooperates with a locally fixed Hall-effect sensor located in the housing.

According to the pressure prevailing in the pressure chamber the moving portion and thus the permanent magnet attached with it more or less moves further toward the Hall-effect sensor whereby the electrical resistance of the sensor changes.

The resistance change is detected by an electronic analyzer (amplifying meter) connected to the Hall-effect device and is converted into an electrical signal with which an electronic instrument, a meter, a regulating device or the like is controllable or reports the pressure.

A pressure sensor of this type is described in German Open Patent Application DE-OS 28 42 140.

Disadvantageously with this known pressure sensor, the measuring range is comparatively small. Of course, it is possible by use of other pressure receiving members to measure pressure over a larger measuring range, for example from 0 to 1000 bar. However, a very expensive electronic analyzer is needed to make use of this pressure sensor and is usually particularly expensive. This is because the Hall-effect sensor has a linear characteristic response curve only in a comparatively small region because the field strength of the magnet decreases with increasing displacement of the magnet nonlinearly and that decrease exceeds that of a simple direct proportionality relationship.

Accordingly, the resistance changes in the Hall-effect sensor on larger displacements of the magnet as would occur with a larger measuring range (with constant resolution) are correspondingly reduced and must be compensated by an expensive and susceptible electronic analyzer. The use of this high resolution electronic analyzer is problematical particularly in underground excavation (e.g. mining) application especially because of the high cost price.

The tough requirements there in regard to temperature, air moisture and vibration bring disturbing influences with them which can lead to inaccurate measurements or to complete breakdown of the apparatus.

OBJECT OF THE INVENTION

It is an object of our invention to provide a sturdy, reliable and compact pressure sensor which covers a broad measurement range with high resolution with mechanically simple means.

Another object is to provide an improved pressure sensor without the drawbacks enumerated above.

SUMMARY OF THE INVENTION

These objects and others which will become more readily apparent hereinafter are attained in accordance with our invention in a pressure sensor with a housing in which a mechanical pressure receiving member and a mechanical-electrical transducer are located. A moving portion of the pressure receiving member is attached at least indirectly with a permanent magnet which is connected to a Hall-effect sensor and together with the Hall-effect sensor comprises the transducer.

According to our invention, the cross section of the housing in the region of the permanent magnet and in the region between the permanent magnet and the Hall-effect sensor is designed, adjusted or tuned to attain an approximately linear field strength increase at the Hall-effect sensor and a linear characteristic response curve on motion of the permanent magnet from one far end position to another near end position.

The solution provided by our invention comprises an adjustment or tuning of the pressure sensor housing in the region of the mechanical-electrical transducer so that the field strength of the field reaching the Hall-effect sensor decreases directly proportionally with increasing displacement of the magnet from the Hall Effect sensor.

The housing is thus designed and shaped so that the field lines are correspondingly bunched with increasing displacement from the Hall Effect sensor. In this way, a pressure transducer with comparatively high measuring range whose moving portion (membrane, pin, bourbon gauge or the like) can execute a comparatively large deflection can be used.

The large displacement of the permanent magnet connected with it relative to the Hall-effect sensor which is thus large is compensated in regard to the magnetic field change by the suitably shaped housing cross section so that the conventional electronic analyzer components can be omitted.

Our invention provides the possibility of a linear magnetic field change with displacement of the magnet in the direction of the Hall-effect sensor or the reverse so that the transducer has a linear characteristic response curve by using only purely mechanical means.

Usually a linear characteristic response curve is attained. It is understood, however, that the concept behind our invention is that by design, adjustment or tuning of the shape of the housing and/or the material thereof in the region between the transducer and the pressure receiving member the characteristic response curve of the transducer is changed.

Also, however, the housing may be correspondingly shaped so that other desirable nonlinear characteristic curves for the transducer can be attained. The adjustment of the housing cross section may be effected by shaping the housing wall and also by selection of the wall thickness or advantageously by both of these methods.

The magnetic flux inside the housing can be increased when the cross section of the housing is adjusted by selection of certain materials for the housing wall. Thus a characteristic response curve change can be attained when a housing wall is built up from materials of different permeability. Especially a multiplicity of characteristic curve changes of the transducer is achieved by combination of housing wall shapes and suitable material choices.

A simply constructed and simultaneously effective design for the housing for bunching field lines in the increasing spacing between the permanent magnet and the Hall-effect sensor is such that the inner surface of the housing wall in regard to the near end position adjacent the Hall-effect sensor of the permanent magnet is substantially cylindrical in the vicinity of the permanent magnet and substantially conical in a region between the Hall-effect sensor and the permanent magnet tapering in the direction of the permanent magnet.

The outer surface of the housing wall can have a substantially cylindrical shape in all regions of course. Because of this design on increasingly larger spacing between the magnet and the Hall-effect sensor the field lines extending from the magnets to the edge region are bunched forward toward the Hall-effect sensor and do not run directly transverse to the housing wall.

The shape of the housing advantageously may be such that the inside of the housing in the vicinity of the permanent magnet comprises two substantially cylindrical regions, the one in which a moving portion of the pressure receiving member travels being of substantially larger diameter. Because of this step inside the housing a stop is formed against which the moving portion of the pressure receiving member is pushed when for example an indeterminate excessively high pressure is present in the pressure receiving member. Hence the Hall-effect sensor is prevented on the one hand from direct contact with the permanent magnet; on the other hand an overload protection for the pressure receiving member can be provided.

BRIEF DESCRIPTION OF THE DRAWING

The above and other objects, features and advantages of our invention will become more readily apparent from the following description, reference being made to the accompanying highly diagrammatic drawing in which.

SPECIFIC DESCRIPTION

Figure 2:
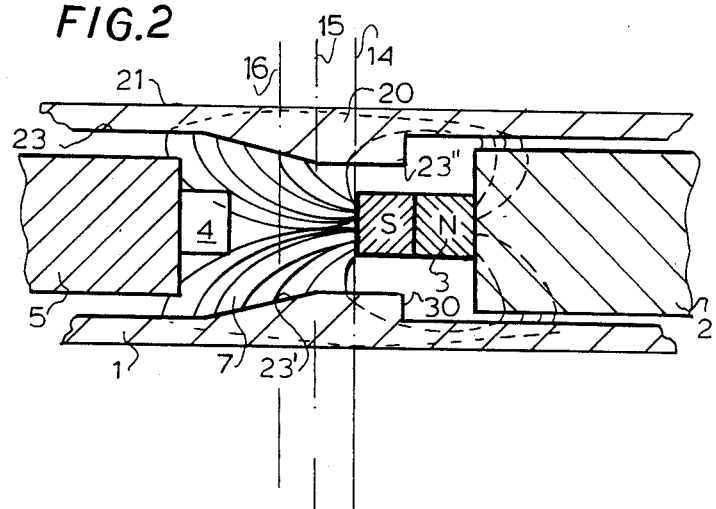
FIGS. 2 to 4 are schematic longitudinal cross sectional views through a portion of a pressure sensor according to our invention with the permanent magnet in different positions relative to the Hall Effect sensor.
Figure 3:
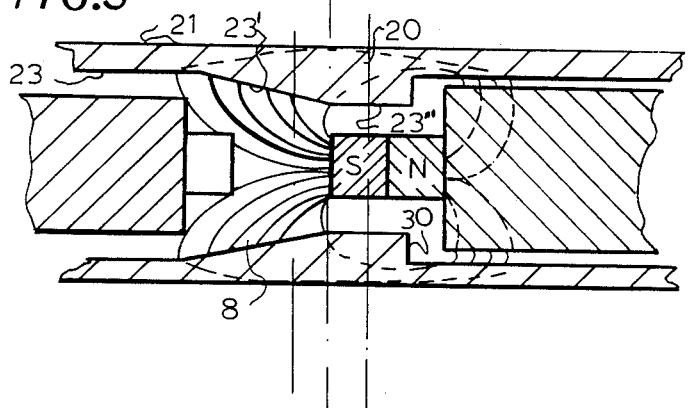
Figure 4:
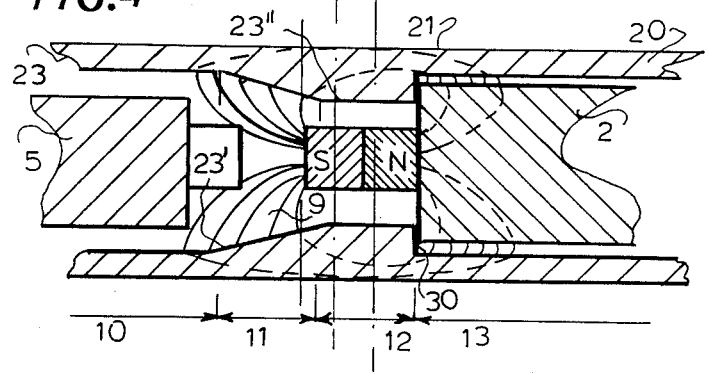

The example of the pressure sensor according to our invention shown in the drawing in FIGS. 2 to 4 is integrated in an approximately cylindrical housing 1 and comprises here a partially unillustrated mechanical pressure receiving member and a mechanical-electrical transducer connected to it.

A pin 2 is positioned slidable axially inside a housing 1 (and/or 1' in FIG. 1) and comprises a moving portion of the pressure receiving member. This pin 2 moves with and is connected with the pressure receiving member, for example a membrane, a peg, a bourbon tube or the like.

A permanent magnet 3 is mounted centrally on the end of the pin 2 facing away from the pressure receiving member. The permanent magnet 3 is polarized in the motion direction of the pin 2, thus in the axial direction of the housing 1.

A Hall-effect sensor 4 is fixed in position in the housing 1 with spacing from the permanent magnet 3. The Hall-effect sensor 4 is mounted on the end of a peg 5 pointing toward the pressure receiving member (or pin 2 of the pressure receiving member). This peg 5 is attached rigidly with the housing 1.

The Hall-effect sensor 4 cooperates with or is acted on by the permanent magnet 3. According to the spacing of the permanent magnet 3 from the Hall-effect sensor 4 the magnetic field extending from the permanent magnet 3 changes so that the electrical properties, especially the electrical resistance of the Hall-effect sensor changes.

These resistance changes are detected by a measuring device connected across the Hall generator and converted to electrical signals.

Figure 1:
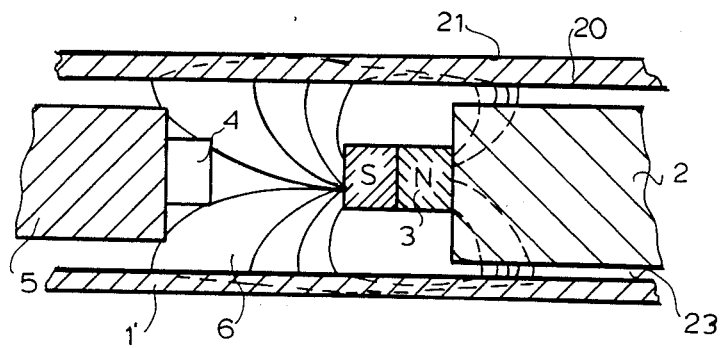
FIG. 1 is a schematic longitudinal cross sectional view through a portion of a pressure sensor according to the prior art.

In a housing 1' as is illustrated in FIG. 1 and which has been used conventionally the field lines 6 of the permanent magnet 3 widen themselves as indicated schematically in FIG. 1. As is apparent from these figures the field strength of the permanent magnet 3 is comparatively high in the polar region and decreases more than a simple direct proportionality relationship would predict with increasing distance from the pole. The Hall-effect sensor 4 equipped with a Hall generator responds to that approximately proportionally to the magnetic field strength.

This has the consequence that the axial displacement region inside of which the permanent magnet 3 can move relative to the Hall-effect sensor 4 is comparatively small in the example according to FIG. 1 so that the measuring range of the pressure sensor following the previously described conventional practice is comparatively narrow or expensive electronic auxiliary devices are subsequently required to compensate for nonlinear behavior.

In the example of the pressure sensor according to our invention shown in FIGS. 2 to 4 by suitably shaping, the housing 1 in the vicinity of the permanent magnet 3 and in a region 11 between the permanent magnet 3 and the Hall-effect sensor 4 the following is achieved: the field lines 7, 8, 9 of the permanent magnet 3 are bunched by the housing 1 with increasing distance of the Hall-effect sensor 4 from the permanent magnet 3 so that for large axial displacements of the permanent magnet 3 and/or the pin 2 an approximately linear field strength change at the Hall-effect sensor 4 is created.

As is clearly apparent with the aid of FIGS. 2 to 4 compared with FIG. 1, the field lines 7, 8, 9 are increasingly bunched with increasing distance of the magnets 3 from the Hall-effect sensor 4.

FIG. 2 shows the permanent magnet 3 in one far end position (indicated by dot-dashed lines 14) and FIG. 4 in the other near end position (indicated by dot-dashed lines 16). The different positions of the permanent magnet 3 are indicated in FIGS. 2 to 4 by the dot-dashed lines 14, 15 and 16 which are correlated with the end of the permanent magnet 3 pointed at the Hall-effect sensor 4 (FIG. 2—line 14, FIG. 3—Line 15, FIG. 4—Line 16).

The spacing of the lines 14 and 16 gives the allowed displacement of the permanent magnet 3 inside of which a linear decrease and/or increase of the field strength occurs at the Hall-effect sensor 4.

This displacement path inside of which a linear field strength change occurs relative to the Hall-effect sensor 4 determines the measuring range of the pressure sensor according to our invention.

The housing 1 shown with the help of FIGS. 2 to 4 has a smooth cylindrical outer surface 21 in the illustrated region. The inner surface 23 of the housing wall 20 of the housing 1 is cylindrical in region 10 (see FIG. 4) in which the peg 5 for the sensor 4 is located.

However, the inner surface 23' connecting the region 10 with the housing center (i.e. region 11) in the direction of pin 2 which extends between the Hall-effect sensor 4 and the front portion of the permanent magnet 3 pointing toward the Hall-effect sensor 4 is conical (relative to the end position of the permanent magnet 3 adjacent the Hall-effect sensor 4, see FIG. 4).

A cylindrical region 12 is connected to the conical region 11 between it and the pin 2. It extends over the length of the magnet 3. At the end of this cylindrical region 12 the housing interior wall jumps back or is stepped back into a cylindrical region 13 which corresponds in its diameter approximately to that of the region 10 and surrounds the pin 2. The step formed thereby inside the housing 1 forms at the same time a stop 30 for the pin 2 in the direction of the Hall-effect sensor 4, which prevents the permanent magnet 3 and the Hall-effect sensor 4 from coming too closely together or colliding.

As is clearly detectable with the help of FIGS. 2 to 4 the inner surface 23' of the housing wall 20 in the region 11 between the Hall-effect sensor 4 and the permanent magnet 3 and in the vicinity of the permanent magnet 3 is funnel shaped and causes the field lines 7, 8, 9 extending from the permanent magnet 3 to be increasingly bunched with increasing distance to the Hall-effect sensor 4 so that the magnetic field strength at the Hall-effect sensor 4 decreases approximately linearly with increasing spacing of the Hall-effect sensor 4 from the permanent magnet 3.

Since the Hall-effect sensor 4 has a linear behavior the computer electronics subsequently connected are comparatively simply. The comparatively large displacement path (distance between 14 and 16) allows the use of a pressure receiving member designed for a large measuring range.

We claim:

1. In a pressure sensor with a housing in which a mechanical pressure receiving member and a connected mechanical electrical transducer are located and in which the moving portion of said pressure receiving member is attached at least indirectly with a permanent magnet which cooperates with or acts on a Hall-effect sensor and together with said Hall-effect sensor comprises said transducer, the improvement wherein the cross section of said housing in the vicinity of said permanent magnet and in a region between said permanent magnet and said Hall-effect sensor is designed, adjusted or tuned to attain an approximately linear magnet field strength decrease at said Hall-effect sensor and a linear characteristic response curve on motion of said permanent magnet from one near end position to another far end position of said permanent magnet, said housing having a round cross section in said region between said permanent magnet and said Hall Effect sensor, the inner surface of said housing wall in reference to said near end position adjacent said Hall-effect sensor of said permanent magnet being substantially cylindrical in said vicinity of said permanent magnet and substantially conical in said region between said Hall-effect sensor and said permanent magnet tapering in the direction of said permanent magnet, the outer surface of said housing wall being substantially cylindrical.

2. In a pressure sensor with a housing in which a mechanical pressure receiving member and a connected mechanical-electrical transducer are located and in which the moving portion of said pressure receiving member is attached at least indirectly with a permanent magnet which cooperates with or acts on a Hall-effect sensor and together with said Hall-effect sensor comprises said transducer, the improvement wherein the cross section of said housing in the vicinity of said permanent magnet and in a region between said permanent magnet and said Hall-effect sensor is designed, adjusted or tuned to attain an approximately linear magnet field strength decrease at said Hall-effect sensor and a linear characteristic response curve on motion of said permanent magnet from one near end position to another far end position of said permanent magnet, the improvement defined in claim 1 wherein said cross section of said housing is adjusted by section of materials or the housing wall, the inner surface of said housing wall in the vicinity of said permanent magnet comprising two substantially cylindrical regions, the one in which a moving portion of said pressure receiving member travels being of substantially larger diameter thus forming a stop on which said moving portion of said pressure receiving member is pushed when an overpressure is present in said pressure receiving member.

3. A pressure sensor comprising:
   a housing having a housing wall with an inner surface and an outer surface, said outer surface of said housing being substantially cylindrical;
   a mechanical pressure receiving member with a moving portion mounted in said housing; and
   a mechanical-electrical transducer also mounted in said housing comprising a relatively stationary Hall-effect sensor and a permanent magnet attached at least indirectly to a moving portion of said pressure receiving member, said permanent magnet cooperating with or acting on said Hall Effect sensor, the cross section of said housing and said inner surface in the vicinity of said permanent magnet being substantially cylindrical, said cross section of said inner surface being substantially conical in a region between said permanent magnet and said Hall-effect sensor tapering in the direction of said permanent magnet and being designed, adjusted or tuned to attain an approximately linear magnet field strength increase at said Hall-effect sensor and a linear characteristic response curve on motion of said permanent magnet from one far end position to another near end position.

4. A pressure sensor comprising:
   a housing having a housing wall with an inner surface and an outer surface;
   a mechanical pressure receiving member with a moving portion mounted in said housing; and
   a mechanical-electrical transducer also mounted in said housing comprising a relatively stationary Hall-effect sensor and a permanent magnet attached at least indirectly to said moving portion of said pressure receiving member, said permanent magnet cooperating or acting with said Hall Effect sensor, said inner surface of said housing wall in reference to a near end position adjacent said Hall-effect sensor of said permanent magnet comprising two substantially cylindrical regions, the one in which a moving portion of said pressure receiving member travels being of substantially larger diameter thus forming a stop on which said moving portion of said pressure receiving member is pushed when an overpressure is acting on said pressure receiving member and said inner surface being substantially conical in a region between said Hall-effect sensor and said permanent magnet tapering in the direction of said permanent magnet, said outer surface of said housing wall being substantially cylindrical.

* * * * *